US008224922B1

(12) United States Patent
Hession et al.

(10) Patent No.: US 8,224,922 B1
(45) Date of Patent: Jul. 17, 2012

(54) WORK FLOW ENGINE FOR CONTROLLING DELIVERY OF MEDIA TREATMENTS TO CUSTOMER CONTACTS

(75) Inventors: Patrick Hession, Oranmore (IE); Arik Elberse, Knocknacarra (IE); John Duncan, Co. Offaly (IE); Lee Dalsu, Thornhill (CA)

(73) Assignee: Avaya Inc., Basking Ridge, NJ (US)

( * ) Notice: Subject to any disclaimer, the term of this patent is extended or adjusted under 35 U.S.C. 154(b) by 1691 days.

(21) Appl. No.: 11/122,717

(22) Filed: May 5, 2005
(Under 37 CFR 1.47)

(30) Foreign Application Priority Data

Jun. 8, 2004 (GB) .................................... 0412727.0

(51) Int. Cl.
*G06F 15/16* (2006.01)
(52) U.S. Cl. ..................... 709/217; 709/202; 709/219
(58) Field of Classification Search .......... 709/202–203, 709/217–219
See application file for complete search history.

(56) References Cited

U.S. PATENT DOCUMENTS

| 7,428,303 | B2 * | 9/2008 | Campbell et al. ........ 379/265.09 |
| 7,568,001 | B2 * | 7/2009 | McPartlan et al. ............. 709/202 |
| 7,769,161 | B1 * | 8/2010 | Hession et al. ............... 709/227 |
| 7,885,847 | B2 * | 2/2011 | Wodtke et al. ................ 709/217 |
| 2002/0083005 | A1 * | 6/2002 | Lowenstein et al. ............ 705/57 |
| 2003/0014483 | A1 * | 1/2003 | Stevenson et al. ............ 709/203 |
| 2003/0018702 | A1 * | 1/2003 | Broughton et al. ........... 709/202 |
| 2003/0120593 | A1 * | 6/2003 | Bansal et al. .................... 705/39 |

* cited by examiner

*Primary Examiner* — Bharat N Barot
(74) *Attorney, Agent, or Firm* — Barnes & Thornburg LLP

(57) ABSTRACT

The present invention recognizes that there is a need to enable scripts or rules within workflow engines to be more dynamic, more easily created, more easily interpreted by other software entities and moreover to enable many different media types to be provided rather than only one such as voice. The present invention addresses this by making use of new types of web-based scripting applications such as VXML and SALT. One or more new commands are added to existing workflow engines to enable them to instruct media servers to access web-based instructions. Those web-based instructions are then executed at the media server to provide additional media treatment control.

14 Claims, 2 Drawing Sheets

Figure 1 — PRIOR ART

WORK FLOW ENGINE FOR CONTROLLING DELIVERY OF MEDIA TREATMENTS TO CUSTOMER CONTACTS

RELATED APPLICATION

This application relates to GB patent application number 0412727.0 filed on 8 Jun. 2004, from which the present application claims priority.

FIELD OF THE INVENTION

The present invention relates to workflow engines for use with customer contact systems and also to systems and methods for controlling delivery of media treatments to customer contacts.

BACKGROUND TO THE INVENTION

Conventional contact centers and self-service systems comprise a workflow engine which is pre-configured by an administrator or operator with parameters about how incoming contacts are to be dealt with. The workflow engine comprises scripts or rules which are used by the overall system for determining how to treat incoming contacts. The term "customer contact system" is used herein to refer to both contact centers (inbound, outbound or mixed contact centers) and self-service systems.

The term "self-service system" is used to refer to a system or application for enabling an end user or customer to make a communications contact in order to automatically receive services. Conventionally such self-service systems have previously used only voice communications over the public switched telephone network (PSTN) although other communications types and media can be used. Examples of self-service systems include an interactive voice response system (IVR) system, a system for playing recorded announcements to a caller; and a system for putting a caller on hold and offering music-on-hold.

The term "contact center" is used to refer to a system for receiving contacts and allocating those incoming contacts amongst a plurality of agent terminals for servicing. The contact can be of any suitable media type such as traditional voice calls, packet-based voice calls, emails, video calls, text messages, chat sessions and others. Contact centers can also be used to generate outbound contacts and in that case the contact center manages distribution of workload between the agents.

In order to provide treatments to contacts, traditional contact centers and self-service systems have used media servers under the control of the workflow engine. Once an administrator has decided upon a flow logic or method for treating contacts he or she has previously written a treatment script or created a set of rules to be executed by the workflow engine. This treatment script has then been executed as part of the operation of the contact center or self-service system in order to control the media server and treat contacts as required.

These conventional types of workflow engine and associated scripts are restrictive and have a significant drawback in that they tend to be proprietary to vendor systems and traditionally have only managed a single media—voice. Typically adding support for new commands and capabilities is cumbersome requiring updates to the Script Interpreter and Workflow Engine and finally the Media Server due to the proprietary nature of each component. This is time consuming and complex. In addition the tools available to the administrator for use in rewriting the script or rules are proprietary also.

Scripts and in fact total solutions tend to be vendor specific for these reasons. These factors in combination have led to the result that workflow engine configuration has tended to be relatively static.

OBJECT TO THE INVENTION

The invention seeks to provide an improved workflow engine for use with customer contact systems.

An object of the present invention is to provide an improved workflow engine and method which overcomes or at least mitigates one or more of the problems mentioned above.

Another object of the present invention is to provide an improved method and system for media treatment control which overcomes or at least mitigates one or more of the problems mentioned above.

SUMMARY OF THE INVENTION

The invention proposes an enhancement to existing proprietary Treatment Scripts, Workflow Engines and Media Servers to enable them to invoke the next generation of standards based Media Handling Scripting language (vXML, CCXML, SALT) in an integrated fashion.

According to a first aspect of the present invention, there is provided a workflow engine for use in a customer contact system to control delivery of media treatments from a media server to a customer contact, said workflow engine comprising:

one or more pre-specified instructions arranged to be sent to said media server in order to cause said media server to access web-based instructions and execute those so providing media treatment control.

According to a second aspect of the present invention, there is provided a method of operating a workflow engine in a customer contact system to control delivery of media treatments from a media server to a customer contact, said method comprising the steps of:

sending one or more first instructions to said media server to cause said media server to provide media treatment to said customer contact;

sending one or more second instructions to said media server to cause said media server to access web-based instructions and execute those so providing media treatment control.

According to a third aspect of the present invention, there is provided a system for controlling delivery of media treatments to a customer contact associated with a customer contact system said system comprising:

a workflow engine at said customer contact system; and
a web-based media server;

wherein said workflow engine is arranged to send pre-specified instructions to said media server and said media server is arranged to access web-based instructions on the basis of the pre-specified instructions and to execute the web-based instructions in order to provide media treatment control.

According to a fourth aspect of the present invention, there is provided a method of controlling delivery of media treatments to a customer contact associated with a customer contact system said method comprising the steps of:

sending instructions from a workflow engine at said customer contact system to a media server; and on the basis of at least some of said instructions using said media server to access web-based instructions and execute those in order to provide media treatment control.

Corresponding computer software or performing the methods of the second and fourth aspects is also provided.

Benefits and advantages of the present invention will become apparent from a consideration of the following detailed description given with reference to the accompanying drawings, which specify and show preferred embodiments of the invention.

The preferred features may be combined as appropriate, as would be apparent to a skilled person, and may be combined with any of the aspects of the invention.

BRIEF DESCRIPTION OF THE DRAWINGS

In order to show how the invention may be carried into effect, embodiments of the invention are now described below by way of example only and with reference to the accompanying figures in which.

DETAILED DESCRIPTION OF INVENTION

Embodiments of the present invention are described below by way of example only. These examples represent the best ways of putting the invention into practice that are currently known to the Applicant although they are not the only ways in which this could be achieved.

Figure 1:
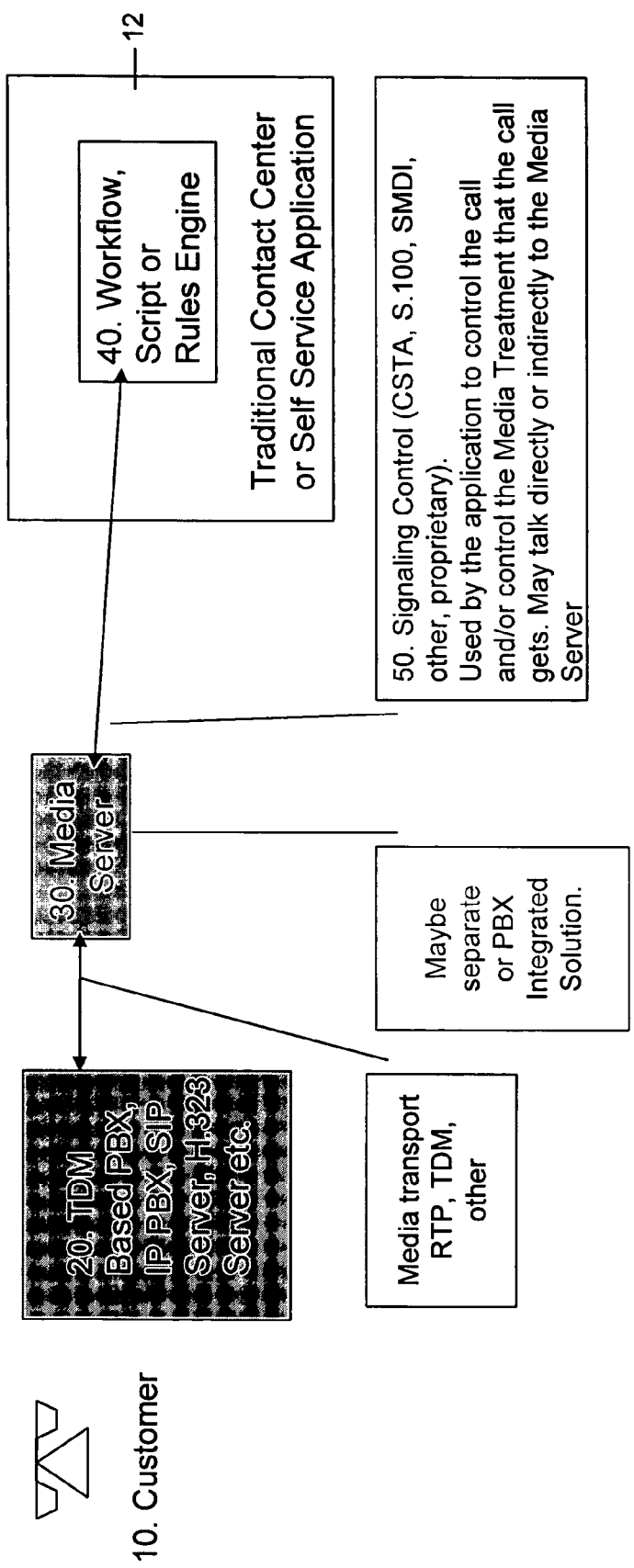
FIG. 1 is a schematic diagram of a prior art workflow engine used in a traditional contact center or self-service arrangement.

FIG. 1 is a schematic diagram of a prior art workflow engine 40 used in a traditional contact center or self-service arrangement. A contact center or self-service application 12 is provided in a communications network and is able to communicate with a media server 30 using a signalling control protocol 50. Typically the contacts being dealt with are telephone calls made by a customer 10 to the contact center or self-service application 12. These calls arrive at a call server 20 which is for example a private branch exchange (PBX) 20 or ISDN Gateway 20. The call server 20, media server 30 and contact center or self-service application 12 are shown in FIG. 1 as separate entities. However, this is not essential, one or more of these entities may be integrated with one another as known in the art.

The contact center or self-service application 12 uses any suitable type of signalling control protocol 50 to control an incoming call from a customer 10. (For example, to perform actions such as call answer and call transfer.) Typically it uses this same signalling control protocol 50 to instruct the media server 30 (either directly or indirectly) how to treat the call. Any suitable signalling control protocol 50 may be used such as (Computer Supported Telecommunications Application) CSTA, S.100 (ECTF Media Services API), (Simplified Message Desk Interface) SMDI, TAPI (Telephony Application Programming Interface) or others.

As mentioned above the workflow engine 40 comprises scripts, rules or equivalents which are pre-configured by an administrator in order to specify how incoming contacts are to be treated. The workflow engine interprets the script(s) or rules and issues appropriate signalling control messages 50 to the media server 30 in order to treat contacts. That is, the workflow engine 40 is can be considered the "master" of the call and it directs the call flow at a high level. For example, the workflow engine determines whether to play a recorded announcement, to start an IVR session, or to play music while the customer waits for the next service.

In some cases the call server 20 and media server 30 exchange collected digit information from scripted exchanges with the customer 10. This information is returned to the workflow engine 40 and used in determining the next step of the call flow.

FIG. 1 illustrates a typical prior art architecture in that it is targeted at support for traditional telephony services. It is best suited for mono-media situations for example, those involving only voice, and is relatively static in that modifying the strategy or approach for treating contacts requires rewriting of the scripts or rules at the workflow engine.

The present invention recognises that there is a need to enable scripts or rules within workflow engines to be more dynamic, more easily created, more easily interpreted by other software entities and moreover to enable many different media types to be provided rather than only one such as voice.

The present invention addresses this by making use of new types of web-based applications. For example, VXML (voice extendible mark-up language as specified by the world wide web consortium (W3C)) and SALT being developed by an industry consortium led by Microsoft (trade mark). These web-based applications typically reside in web servers and are either addressed by specific http URLs or are embedded parts of standard web pages.

By using these types of web based applications many advantages are achieved including:

- As a result, a broad range of web page development tools that are currently available can be used to facilitate development of scripts for use in the workflow engine.
- These web-based applications are often XML (extendible mark-up language) based and this enables other software applications to use standard components to interpret them.
- These web-based applications are dynamic so that their use can facilitate dynamic changes and updates to the workflow engine.
- These web-based applications enable multi-modal information flow.

That is information flow in different media types such as voice, video, text etc rather than the mono-modal operation provided by the prior art architectures illustrated in FIG. 1.

A problem then arises in how to enable these web-based applications to be used in conjunction with existing contact center and self-service architectures such as those illustrated in FIG. 1, without the need for major changes to the architecture or existing contact center and self-service equipment. The present invention achieves this by using a web-enabled media server in place of conventional media server 30 and by making improvements to the workflow engine 40.

Figure 2:
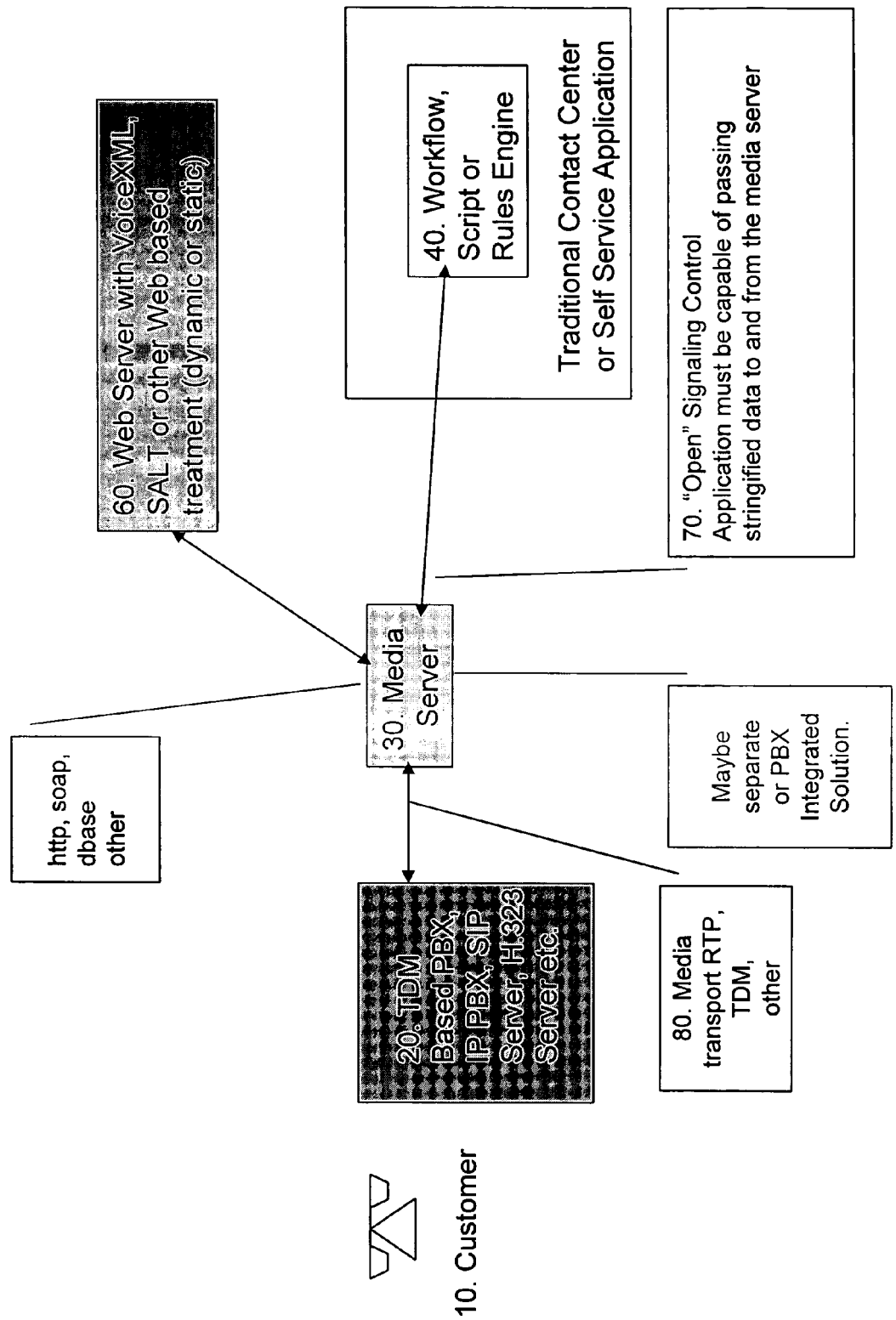
FIG. 2 is a schematic diagram of a workflow engine suitable for use in the present invention.

FIG. 2 is a schematic diagram showing the modifications made to the architecture of FIG. 1 in order to enable web-based applications to be used to facilitate media service control in conjunction with the workflow engine. The same reference numerals are used as in FIG. 1 for the same components although the workflow engine 40 of FIG. 2 is modified and improved over the workflow engine 40 of prior art FIG. 1 as is the media server 30.

As shown the media server 30 is in communication with a web server 60. That is, the media server 30 is now web-enabled in order to interact with web server 60 and retrieve web centric media services pages from the web server 60. This is done using http or any other suitable communications protocol. The web server 60 comprises a web-based application such as vXML or SALT.

In addition the media server 30 comprises a suitable interpreter for interpreting web pages downloaded from the web server 60. Once interpreted these downloaded web pages provide instructions or information about what media treatments to deliver to the customer 10.

In this way it is no longer necessary to rely wholly on the workflow engine script or rule base as specifying the manner in which media treatments are effected. Consider the situation in which an administrator requires to change the media treatment control. He or she is able to use web-based tools to create suitable web pages at the web server 60. The workflow engine 40 is then arranged to send instructions to the media server to download specified web pages comprising vXML or other web based instructions and once downloaded, to execute those. In this way the administrator does not need to completely rewrite or update the existing proprietary scripts or rules at the workflow engine itself. By simple addition of one command enhancement (the ability to invoke execution of a vXML or other next generation script) the administrator gains all the benefits of being able to use web-based tools to form the web pages containing the vXML or other web centric scripts. All the other advantages mentioned above of using web-based applications are also reaped without the need for any major changes at the contact center or self-service system.

The instructions sent by the workflow engine 40 to the media server 30 can be of any suitable type. For example, new commands, variations of existing commands or control data. The workflow engine 40 is effectively providing a primary workflow or master workflow which is then supplemented by any web based scripts that it specifies should be used. The workflow engine decides primarily on the basis of existing logic within the workflow engine what the high level treatment flow is and when and what media treatment should be given for a call at any point in time.

However, instead of simply invoking legacy commands as illustrated in FIG. 1 the workflow engine is "opened" to be able to pass data to the media server 30 such that the media server 30 is directed to retrieve and execute web based scripts which are provisioned separately (but in complement to) the workflow script 40.

In a first embodiment the workflow engine is arranged to direct messages to a messaging bus (such as SIP messaging bus 70). This changes the workflow engine architecture but not the nature of the workflow scripts. Legacy technical knowledge of the workflow engine scripting environment is thus leveraged. The messaging bus 70 represents a change over the system of FIG. 1 and is preferably standards based. In this embodiment changes to the workflow engine interpreter are made.

In a second embodiment the workflow engine is arranged to use existing messages for communication with the media server which have capability to support generic data (e.g. stringified data or application to application data sharing). In this way the workflow engine does not create a unique message sequence over a defined protocol for invoking vXML; instead it simply delivers call attached data to an endpoint which can convert this data to a voiceXML invocation which can be handed to the Media Server. In this case no changes are required to the workflow engine interpreter although changes to an external interpreter are required.

In an embodiment of the invention the workflow engine has knowledge of the effects the web based instructions will have on media treatment control. However, this is not essential, the workflow engine can also have little or no knowledge of the effects the web based instructions will have. In that case the web-based instructions themselves are more complex to enable more of the burden of media treatment control to be taken away from the workflow engine. In this way the workflow administrator can make design choices as to how the media treatment control is to be shared between the workflow engine and the web-based scripts and how this is to be implemented.

As mentioned above the instructions sent by the workflow engine 40 to the media server 30 can be of any suitable type. For example, addition of one new command to a legacy workflow engine (for example the addition of a giveVXML command) effectively introduces all the power of web centric dynamic scripts to the workflow administrator. It is not essential for the workflow administrator to be knowledgeable about the web centric scripts because he or she can rely on a web centric developer to provide this capability. In this way the workflow administrator can continue to define exactly how media treatments should be controlled and continue to use his or her existing expertise about the legacy workflow script environment but, at the same time, increase the flexibility and power of his or her legacy solution architecture by seamlessly introducing web centric media services.

Another advantage is that when it is required to upgrade the customer contact system to deal with other media types such as video or web collaboration, then the existing workflow engine can still be used. Previously this would only have been possible by upgrading the workflow engine as well. Now, it is possible to use the web-centric scripts to provide the control needed for the new media types.

The embodiments described herein are particularly advantageous when used in conjunction with a session initiation protocol (SIP) enabled customer contact system. For example, a SIP enabled contact center as described in earlier U.S. patent application Ser. No. 10/743,971 filed on Dec. 23, 2003 which is also assigned to Nortel Networks Limited. The whole contents of that earlier application are incorporated herein by reference. SIP as a protocol is advantageous for use with the present invention in that:

it is standards based (RFC3261)

it allows transport of any data in many formats. For example the workflow engine is able to use SIP to transfer a message body which has a reference to a vXML script; or it can invoke an addressable SIP Service that it knows can interpret vXML; or it can use inbuilt SIP Headers (such as CallInfo header) to point the SIP Media Server to the vXML in a generic or standards fashion.

SIP can also be used to return data (rather than some other out of band means).

In general SIP is very suitable for integration of Web Applications as it itself is a Web Centric Signalling Protocol

The invention claimed is:

1. A workflow engine for use in a customer contact system to control delivery of media treatments from a media server to a customer contact received at the customer contact center, the customer contact center being arranged to receive and allocate customer contacts to agents for servicing, said workflow engine comprising:

one or more pre-specified instructions arranged to be sent to said media server in order to cause said media server to download web-based instructions on the basis of the pre-specified instructions and execute those web-based instructions, to thereby control the delivery of the media treatments from the media server to the customer contact received at the customer contact center.

2. A workflow engine as claimed in claim 1 wherein said web-based instructions comprise any of: web-centric scripts; vXML instructions and SALT instructions.

3. A workflow engine as claimed in claim 1 wherein said pre-specified instructions comprise control data or commands.

4. A workflow engine as claimed in claim 3 wherein said commands comprise a giveVXML command.

5. A workflow engine as claimed in claim 1 wherein said pre-specified instructions cause said media server to download web pages comprising said web based instructions from a web server.

6. A workflow engine as claimed in claim 1 which is itself non-web based.

7. A workflow engine as claimed in claim 1 wherein said pre-specified instructions are sent to said media server using an open signalling protocol.

8. A workflow engine as claimed in claim 1 which is arranged to have knowledge of the media treatment effects of the pre-specified instructions.

9. A method of operating a workflow engine in a customer contact system to control delivery of media treatments from a media server to a customer contact received at the customer contact center, the customer contact system being arranged to receive and allocate customer contacts to agents for servicing, said method comprising the steps of:
    sending one or more first instructions to said media server to cause said media server to provide media treatment to said customer contact received at the customer contact center;
    sending one or more second instructions to said media server to cause said media server to download web-based instructions on the basis of the second instructions and execute those web-based instructions, to thereby control the delivery of the media treatments from the media server to the customer contact received at the customer contact center.

10. Computer software in machine-readable form arranged to control a workflow engine in order to carry out the method of claim 9.

11. A system for controlling delivery of media treatments to a customer contact associated with a customer contact system for receiving customer contacts and allocating the customer contacts to agents for servicing, said system comprising:
    a workflow engine at said customer contact system; and
    a web-based media server;
    wherein said workflow engine is arranged to send pre-specified instructions to said media server and said media server is arranged to download web-based instructions on the basis of the pre-specified instructions and to execute the web-based instructions in order to control the delivery of the media treatments from the media server to the customer contact received at the customer contact center.

12. A system as claimed in claim 11 wherein said media server comprises an interpreter arranged to interpret the web-based instructions.

13. A method of controlling delivery of media treatments to a customer contact associated with a customer contact system for receiving customer contacts and allocating the customer contacts to agents for servicing, said method comprising the steps of:
    sending instructions from a workflow engine at said customer contact system to a media server; and
    on the basis of at least some of said instructions, using said media server to download web-based instructions and execute those web-based instructions, to thereby control the delivery of the media treatments from the media server to the customer contact received at the customer contact center.

14. Computer software in machine readable form arranged to control a system for controlling delivery of media treatments to a customer contact associated with a customer contact system said computer software being arranged to control said system in order to carry out the steps of claim 13.

* * * * *